(12) United States Patent
Friedrich et al.

(10) Patent No.: US 7,173,519 B2
(45) Date of Patent: Feb. 6, 2007

(54) CIRCUIT ARRANGEMENT WITH SIMPLIFIED INPUT CIRCUIT FOR PHASE MODULATION IN A BACKSCATTERING TRANSPONDER

(75) Inventors: Ulrich Friedrich, Ellhofen (DE); Martin Fischer, Gleichen (DE)

(73) Assignee: Atmel Germany GmbH, Heilbronn (DE)

( * ) Notice: Subject to any disclaimer, the term of this patent is extended or adjusted under 35 U.S.C. 154(b) by 268 days.

(21) Appl. No.: 10/855,866

(22) Filed: May 26, 2004

(65) Prior Publication Data

US 2004/0257293 A1 Dec. 23, 2004

(30) Foreign Application Priority Data

May 28, 2003 (DE) ................. 103 25 399

(51) Int. Cl.
*H04Q 5/22* (2006.01)
*H01Q 9/00* (2006.01)
*H01Q 15/14* (2006.01)

(52) U.S. Cl. ............... 340/10.4; 343/745; 343/913
(58) Field of Classification Search ............. 340/10.4, 340/10.5, 10.51, 10.52; 343/913
See application file for complete search history.

(56) References Cited

U.S. PATENT DOCUMENTS

| | | | |
|---|---|---|---|
| 4,040,053 A | | 8/1977 | Olsson |
| 4,518,965 A | * | 5/1985 | Hidaka ............... 343/742 |
| 4,814,776 A | * | 3/1989 | Caci et al. ............ 343/702 |
| 5,119,099 A | | 6/1992 | Haruyama et al. |
| 5,153,583 A | | 10/1992 | Murdoch |
| 5,206,639 A | | 4/1993 | Kamens |
| 5,218,343 A | | 6/1993 | Stobbe et al. |
| 5,321,395 A | * | 6/1994 | Van Santbrink ........... 340/10.4 |
| 5,430,441 A | * | 7/1995 | Bickley et al. ......... 340/10.42 |
| 5,446,447 A | * | 8/1995 | Carney et al. ............. 340/10.4 |
| 5,564,069 A | | 10/1996 | Grabow et al. |
| 5,606,323 A | | 2/1997 | Heinrich et al. |
| 5,731,691 A | | 3/1998 | Noto |
| 5,774,062 A | * | 6/1998 | Ikefuji ................. 340/10.4 |
| 5,889,489 A | | 3/1999 | Friedman et al. |
| 6,054,925 A | | 4/2000 | Proctor et al. |

(Continued)

FOREIGN PATENT DOCUMENTS

DE   4017625   12/1990

(Continued)

*Primary Examiner*—Wendy R. Garber
*Assistant Examiner*—Clara Yang
(74) *Attorney, Agent, or Firm*—W. F. Fasse; W. G. Fasse

(57) ABSTRACT

A circuit arrangement for phase modulation in an input circuit of a backscattering transponder includes a varactor and at most one capacitor connected in series between two antenna terminals, as well as a varactor control arrangement applying a control voltage to the varactor to selectively vary the capacitance thereof. One of the antenna terminals is connected directly to one of the varactor terminals without a capacitor therebetween. The other antenna terminal is connected either directly or through a capacitor to the other varactor terminal. One antenna terminal and/or one varactor terminal can be grounded. A DC-decoupling capacitor can be connected between a transponder circuit unit or a circuit ground and the common junction of the antenna terminal with the varactor terminal. The circuit arrangement is simple, economical, and uses minimal chip area by omitting further capacitors between the antenna terminals.

24 Claims, 2 Drawing Sheets

U.S. PATENT DOCUMENTS

| | | |
|---|---|---|
| 6,347,121 B1 | 2/2002 | Sointula |
| 6,366,164 B1 | 4/2002 | Hanselmann |
| 6,664,770 B1 | 12/2003 | Bartels |
| 6,941,113 B2 | 9/2005 | Asano |
| 2002/0080864 A1 | 6/2002 | Kuttruff et al. |
| 2002/0153996 A1 | 10/2002 | Chan et al. |
| 2003/0102961 A1 | 6/2003 | Fischer et al. |
| 2003/0107483 A1 | 6/2003 | Kano |
| 2003/0205571 A1 | 11/2003 | Flugstad et al. |
| 2004/0145452 A1 | 7/2004 | Fischer et al. |
| 2004/0155754 A1 | 8/2004 | Fischer et al. |
| 2004/0257220 A1 | 12/2004 | Fischer et al. |
| 2005/0104790 A1* | 5/2005 | Duron .................... 340/10.51 |

FOREIGN PATENT DOCUMENTS

| | | |
|---|---|---|
| DE | 43 32 475 | 3/1995 |
| DE | 19614455 | 10/1997 |
| DE | 2 321 726 | 8/1998 |
| DE | 198 00 565 | 7/1999 |
| DE | 199 33 978 | 1/2001 |
| DE | 19958265 | 6/2001 |
| DE | 10158442 | 6/2003 |
| EP | 0599143 | 6/1994 |
| EP | 1026832 | 8/2000 |
| EP | 1211635 | 6/2002 |
| FR | 2 644 308 | 9/1990 |
| GB | 2 224 182 | 4/1990 |

* cited by examiner

CIRCUIT ARRANGEMENT WITH SIMPLIFIED INPUT CIRCUIT FOR PHASE MODULATION IN A BACKSCATTERING TRANSPONDER

CROSS-REFERENCE TO RELATED APPLICATIONS

This application is related to U.S. application Ser. No. 10/753,849, filed Jan. 7, 2004 and issued as U.S. Pat. No. 6,940,467 on Sep. 6, 2005, and U.S. application Ser. No. 10/753,859, filed Jan. 7, 2004, the entire disclosures of both of which are incorporated herein by reference. This application is further related to U.S. application Ser. No. 10/855,865 filed May 26, 2004, the entire disclosure of which is incorporated herein by reference.

PRIORITY CLAIM

This application is based on and claims the priority under 35 U.S.C. §119 of German Patent Application 103 25 399.8, filed on May 28, 2003, the entire disclosure of which is incorporated herein by reference.

FIELD OF THE INVENTION

The invention relates to a circuit arrangement for producing a phase modulation in a backscattering transponder having a varactor in an input circuit thereof.

BACKGROUND INFORMATION

There are various known systems in which a wireless or contactless data transmission is carried out between one or more base stations or reader devices and one or more so-called transponders. Such systems are used, for example, as contactless identification systems or so-called RFID (radio frequency identification) systems. In that case, the data to be transmitted relates to an identification protocol, for example. It is further possible to integrate one or more sensors, for example temperature measuring sensors, on the transponder. Such transponders equipped with integrated sensors are then also referred to as remote sensors, whereby the data to be transmitted may comprise the actual values measured by the sensor.

The transponders, or particularly the receiving/backscattering arrangements thereof, typically do not comprise an active transmitter for actively carrying out the data transmission to the base station. Instead, the transponders are non-active systems that can be designated as passive systems if they do not comprise their own power supply, or as semi-passive systems if they do comprise their own power supply. In such non-active systems, the data transmission in the far range field of the base station is generally carried out using a so-called backscattering or backscatter-coupling of UHF waves or microwaves between the receiving/backscattering arrangement (i.e. transponder) and the base station. While such non-active transponders are sometimes also called receiver/transmitters or receiving/transmitting arrangements, this application uses the more accurate term "receiving/backscattering arrangement", because this arrangement does not actively transmit but rather merely reflects or backscatters the modulated received electromagnetic wave.

In this regard, the base station emits electromagnetic waves, which are received by the transponder, and then modulated by the transponder in accordance with the particular data that are to be transmitted back to the base station. The thusly modulated signal or electromagnetic waves are then reflected or backscattered with the modulation back to the base station. This is generally achieved using an input impedance variation of the receiving/backscattering arrangement, which causes a corresponding variation of the reflection characteristics of an antenna connected thereto. Thereby the reflected or backscattered signal is correspondingly modulated, so that the base station can receive and evaluate the modulated backscattered signal. Various different methods are known for achieving such modulation.

A first known method of carrying out the above described modulation, for example as described in the published European Patent Application EP 1 211 635, the real part of the input impedance is varied by connecting or disconnecting an essentially ohmic (i.e. resistive) load, which causes mainly an amplitude variation or amplitude modulation of the reflected waves. This modulation method is generally referred to as amplitude shift keying (ASK). Disadvantageously, the variable ohmic or resistive load used for the modulation acts as an additional power consumer that loads the voltage supply of the transponder, whereby the maximum operating transmission range between the transponder and the base station is considerably reduced, especially for a passive transponder without its own power supply.

In a second known method of achieving the above discussed modulation, the imaginary part of the input impedance is varied or influenced by varying the capacitance of a capacitor in the input portion or stage of the receiving/transmitting or backscattering arrangement. This causes mainly a phase variation or a phase modulation of the reflected waves, and is generally referred to as phase shift keying (PSK). In comparison to the ASK method, this PSK modulation method practically does not influence the operating voltage, whereby a high operating efficiency of the transponder can be achieved, and the maximum backscattering range between the transponder and the base station is increased.

Such a PSK method as well as an apparatus or circuit arrangement suitable for carrying out such a method is disclosed, for example in the German Patent Application DE 101 58 442.3 (published Jun. 26, 2003) of the same Assignee as the present application. Also see the counterpart U.S. Published Application US 2003/0102961 A1 (published Jun. 5, 2003), the disclosure of which is incorporated herein by reference. According to those publications, a capacitance variation in the input circuit of the device is achieved by means of a controllable capacitor in the form of a varactor, to which a variable control voltage is applied through varactor control means comprising a controllable voltage source. Thereby, in response to the variable voltage applied to the varactor, the capacitance of the varactor is correspondingly varied. According to those publications, a series arrangement of the varactor between two capacitors is connected between the two antenna terminals. Namely, a first capacitor is connected between the first antenna terminal and the first terminal of the varactor, while a second capacitor is connected between the second antenna terminal and the second terminal of the varactor.

SUMMARY OF THE INVENTION

In view of the above, it is an object of the invention to provide a circuit arrangement for producing a phase modulation in an input circuit of a backscattering transponder, which is economical in its fabrication, simple in its structure, compact in chip surface area, and achieves a simple and effective controllability of the varactor. The invention further aims to avoid or overcome the disadvantages of the prior art, and to achieve additional advantages, as apparent from the present specification.

The above objects have been achieved according to the invention in a circuit arrangement for phase modulation in a backscattering transponder through input impedance variation of an input circuit of the transponder, comprising first and second antenna terminals for connecting an antenna in the input circuit, a varactor connected in the input circuit, and a varactor control arrangement that applies a variable control voltage to the varactor so as to vary the capacitance of the varactor. Particularly according to the invention, at most one capacitor is additionally connected in series with the varactor in the input circuit between the first and second antenna terminals, namely either between the first antenna terminal and a first terminal of the varactor or between the second antenna terminal and a second terminal of the varactor. According to the invention, this also includes an embodiment in which no capacitor is connected in series with the varactor between the two antenna terminals.

In other words, at least one of the antenna terminals, or possibly even both of the antenna terminals, is or are connected directly to the respective terminal or terminals of the varactor without a capacitor interposed therebetween. In this context, the antenna terminal being "connected directly" to the associated varactor terminal means that no capacitor or discrete purposeful capacitive element is interposed therebetween, and preferably the connection between the antenna terminal and the varactor terminal is provided by merely a conductor such as a conductor path, a conductor line, a bond wire, or the like.

The term "capacitor" herein, for simplicity, shall encompass all possible electrical circuit components with a capacitive effect. In this regard, a "capacitor" can also be formed by a plurality of individual capacitors or individual capacitive elements connected together in parallel or series. In any event, one of the two terminals of the varactor remains free of a capacitor, i.e. is not connected to a further capacitor. Thereby, this reduces the number of capacitors in the overall circuit arrangement, which reduces chip surface area and also reduces the fabrication costs.

In a further embodiment of the inventive circuit arrangement, the first antenna terminal may be connected directly to a reference potential, for example the ground potential. This provides a reliable, simple, low-resistance coupling of the antenna to the reference voltage.

In a further embodiment of the invention, the circuit arrangement additionally includes a transponder circuit unit, which may particularly comprise a rectifier and/or a data or symbol recovery circuit for recovering data or symbols from the received signal. In this embodiment, a DC-decoupling capacitor may be connected between one of the antenna terminals and this transponder circuit unit. This decoupling capacitor serves to DC-decouple the transponder circuit unit, especially from the control voltage applied to the associated varactor terminal that is connected to this pertinent antenna terminal. This decoupling capacitor may be a discrete component or an integrated element of the transponder circuit unit.

According to another feature of the invention, a further decoupling capacitor may be circuit-connected between one antenna terminal and a reference potential. This decoupling capacitor serves to DC-decouple the varactor control voltage from the reference potential.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
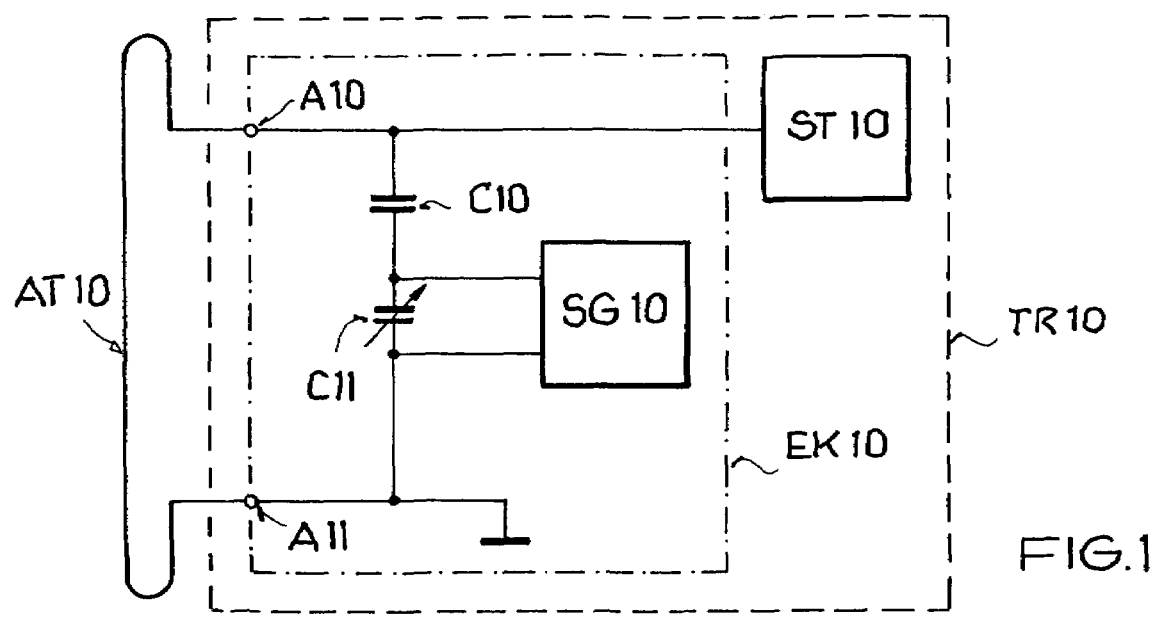
FIG. 1 is a schematic block circuit diagram of a circuit arrangement according to a first embodiment of the invention, for phase modulation in a backscattering transponder having a closed loop antenna.

The circuit arrangement for phase modulation in a transponder TR10 as shown in FIG. 1 forms an input circuit EK10 of the transponder TR10 comprising first and second antenna terminals A10 and A11 for connecting a closed loop antenna AT10, a capacitor C10 and a controllable capacitor in the form of a varactor C11 connected in series between the two antenna terminals A10 and A11, as well as a varactor control arrangement comprising a voltage generator SG10.

The voltage generator SG10 applies a control voltage to the varactor C11, i.e. across the first and second varactor terminals of the varactor C11. In response to the varying control voltage, the varactor C11 varies its capacitance, which in turn varies the impedance of the input circuit and thus varies the phase angle of the phase modulation of the signal that is backscattered from the antenna AT10. Thus, through suitable control of the variation of the control voltage in response to and dependent on the data or information that is to be phase-modulated onto the backscattered signal, the capacitance of the varactor C11 is controlled to achieve this result.

In this regard, the varactor characteristic curve, i.e. the varactor capacitance as a function of the varactor voltage, is preferably essentially point symmetrical or rotationally symmetrical about the intersection point of the characteristic curve with the capacitance axis (e.g. Y-axis) at zero voltage. In order to utilize the full capacitance range or swing of the varactor C11, it is thus advantageous to selectively apply both positive as well as negative control voltages. Dependent on the particular semiconductor technology being used, the characteristic curve of the varactor can be shifted in the direction of the X-axis, i.e. along the voltage axis. Depending on the degree of this shifting, it is possible to apply control voltages with only one polarity, e.g. a sufficient range of positive voltage values in order to utilize the full capacitance swing of the varactor. This simplifies the structure of the voltage generator SG10, for example because the voltage generator SG10 then does not need to generate any negative voltage values. The voltage generator can have any structure and operation known for producing a controllable variable voltage.

In this example embodiment of FIG. 1, the second antenna terminal A11 is connected directly to a reference potential, in this case the ground reference voltage. The second varactor terminal of the varactor C11 is also connected directly to the ground reference voltage and to the second antenna terminal A11. On the other hand, the capacitor C10 is connected between the first varactor terminal of the varactor C11 and the first antenna terminal A10. Throughout this application, it should be understood that the terms "first" terminal and "second" terminal are merely reference names that have no limiting or defining effect and that can be interchanged.

The transponder TR10 of FIG. 1 additionally comprises further circuit components, which have been grouped or collected together for simplicity as a transponder circuit unit ST10, which may, for example comprise a rectifier and/or a data or symbol recovery circuit. In order to DC-decouple the transponder circuit unit ST10 from the control voltage that is generated by the voltage generator SG10 and applied to the varactor C11, merely the above mentioned capacitor C10 is provided between the varactor C11 and the circuit unit ST10. In other words, this capacitor C10 is connected between the first terminal of the varactor C11 and the common junction node of the first antenna terminal A10 with the transponder circuit unit ST10.

Figure 2:
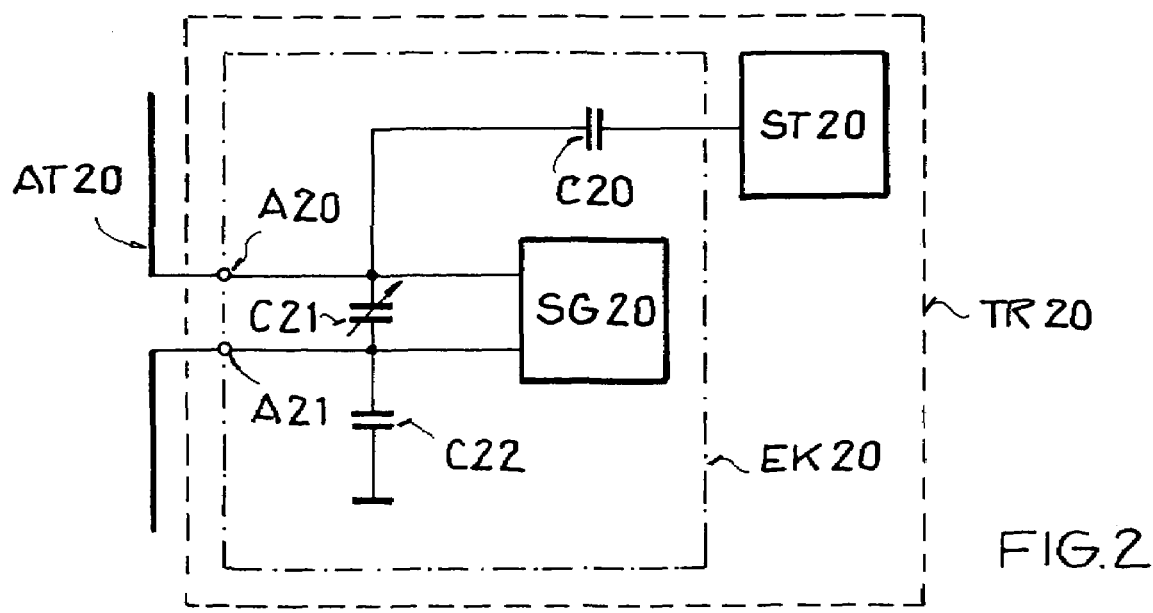
FIG. 2 is a schematic block circuit diagram of a circuit arrangement according to a second embodiment of the invention, for phase modulation in a backscattering transponder with an open non-loop antenna.

FIG. 2 shows a second embodiment of the circuit arrangement according to the invention for a transponder TR20 having an open non-loop antenna, e.g. a dipole antenna. In this circuit arrangement, an input circuit EK20 of the transponder TR20 comprises a first decoupling capacitor C20 connected between a first antenna terminal A20 and a transponder circuit unit ST20, a varactor C21 connected between the first and second antenna terminals A20 and A21, a second decoupling capacitor C22 connected between the second antenna terminal A21 and a reference potential such as a ground potential, as well as a voltage generator SG20 of which the function corresponds to that of the voltage generator SG10 described above in connection with FIG. 1. The transponder circuit unit ST20 corresponds to the circuit unit ST10 described above in connection with FIG. 1.

In the illustrated example, the decoupling capacitor C20 is an independent discrete circuit element separate from the transponder circuit unit ST20. Alternatively, the decoupling capacitor C20 can be a component of or incorporated in the circuit unit ST20. An open non-loop antenna AT20, for example embodied as a dipole, can be connected to the two antenna terminals A20 and A21. In this embodiment, the two antenna terminals A20 and A21 are both respectively connected directly to the two varactor terminals of the varactor C21, without any capacitor interposed or connected therebetween. Instead, the capacitor C20 is arranged between the transponder circuit unit 20 and the common junction node of the first antenna terminal A20 with the first varactor terminal, while the second capacitor C22 is connected between the ground potential and the common junction node of the second antenna terminal A21 with the second varactor terminal of the varactor C21.

Figure 3:
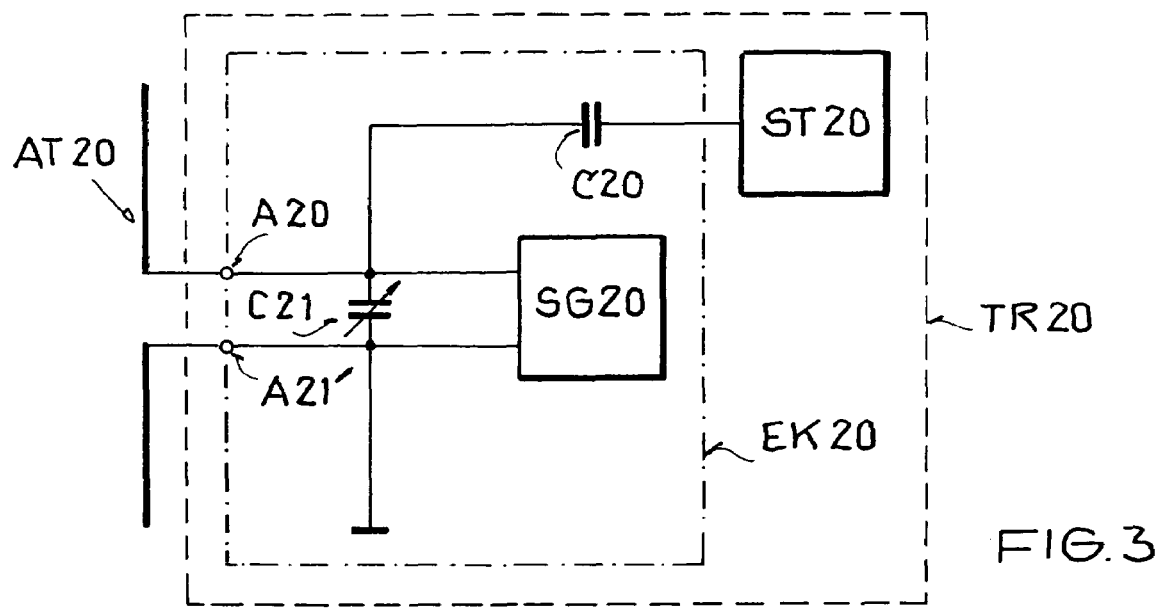
FIG. 3 is a schematic block circuit diagram of a further circuit arrangement according to the invention for phase modulation in a backscattering transponder with an open non-loop antenna.

A third embodiment of an inventive circuit arrangement is shown in FIG. 3, which substantially corresponds to the embodiment according to FIG. 2, except that the second blocking or decoupling capacitor C22 has been omitted. Instead, the second antenna terminal A21' as well as the mutually connected second varactor terminal of the varactor C21 are directly connected to the reference potential. Thereby, the second terminal of the voltage generator SG20 is also connected directly to the reference potential, e.g. the voltage generator SG20 in this case always operates to apply a control voltage to the varactor relative to ground. Otherwise, the structure and operation of the circuit according to FIG. 3 correspond to that of FIG. 2.

Figure 4:
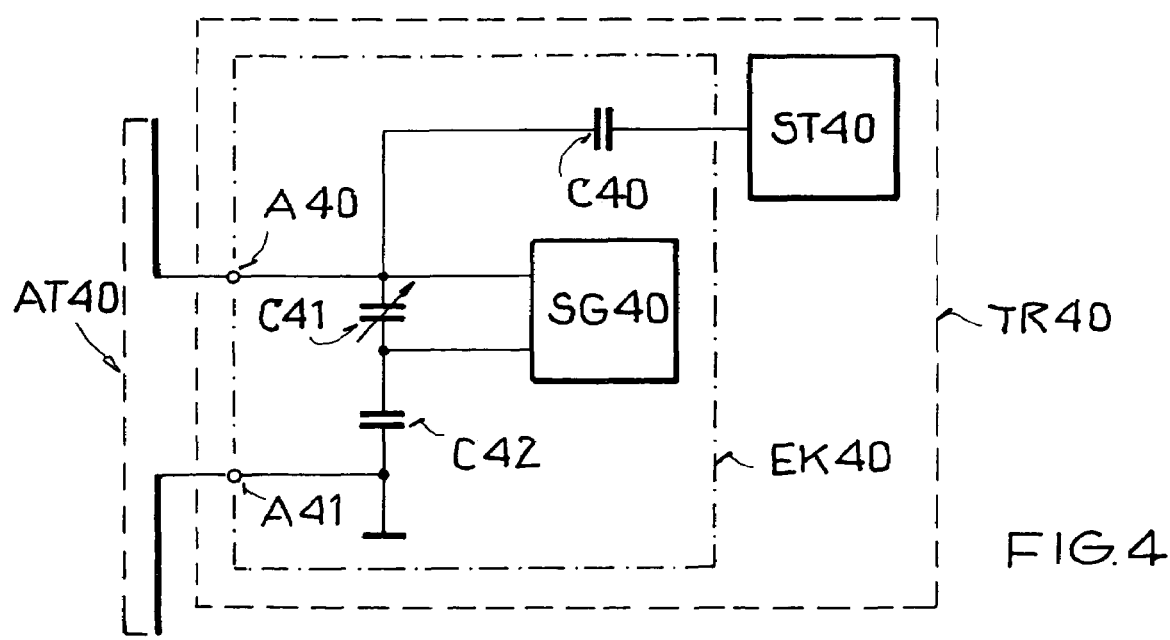
FIG. 4 is a schematic block circuit diagram of another circuit arrangement according to the invention for phase modulation in a backscattering transponder with a closed loop antenna or an open non-loop antenna.

FIG. 4 shows a circuit arrangement for a transponder TR40 that is suitable for open (e.g. dipole) as well as closed (e.g. loop) antennas. Namely, an open or closed antenna AT40 can be connected to the first and second antenna terminals A40 and A41 of the input circuit EK40 of the transponder TR40. In the input circuit EK40, a varactor C41 and a capacitor C42 are connected in series between the two antenna terminals A40 and A41. A control voltage generator SG40 is connected to the two varactor terminals on opposite sides of the varactor C41 so as to apply a control voltage thereto. The operation and function of the voltage generator SG40 corresponds to those of the voltage generator SG10 according to FIG. 1.

For DC-decoupling the control voltage applied to the varactor C41 by the voltage generator SG40, only the capacitor C42 is provided in series between the two antenna terminals A40 and A41. Namely, the capacitor C42 is connected between the second varactor terminal of the varactor C41 and the second antenna terminal A41.

The second antenna terminal A41 is also directly connected to a reference potential such as ground. On the other hand, the first antenna terminal A40 is connected directly to the first varactor terminal of the varactor C41, which is also connected to one of the voltage applying terminals of the voltage generator SG40.

The transponder TR40 further includes a circuit unit ST40 having a structure, function and operation corresponding to the circuit unit ST10 of the circuit arrangement of FIG. 1. This transponder circuit unit ST40 is connected through a further decoupling capacitor C40 to the common junction node of the first antenna terminal A40 with the first varactor terminal of the varactor C41. This capacitor C40 is illustrated as an independent discrete component, but may alternatively be an incorporated element of the circuit unit ST40.

All of the inventive embodiments illustrated in FIGS. 1 to 4 share the common feature that at most one capacitor (or no capacitor) is connected in series with the varactor between the two antenna terminals. In other words, at most one capacitor is connected either between the first antenna terminal and the first varactor terminal or between the second antenna terminal and the second varactor terminal. This covers embodiments in which there is no capacitor connected in series with the varactor between the two antenna terminals such as FIGS. 2 and 3, as well as embodiments having one capacitor connected in series with the varactor between the two antenna terminals such as FIGS. 1 and 4. This also means that at least one of the antenna terminals is connected directly to an associated one of the varactor terminals without any capacitor interposed therebetween. This is achieved, for example, by making use of other system components, for example, particularly other previously existing decoupling capacitors of further circuit components or units of a transponder circuit. This is further made possible through a suitable selection of the connection points of the antenna relative to the other elements of the circuit arrangement. It is further possible to simplify the construction of the voltage generator by using only a part of the capacitance range or swing of the varactor. All of these measures reduce the number of the necessary components or elements of the circuit arrangement, and thus achieve a simple structure and an economical fabrication of the transponder device.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A phase modulating backscattering transponder comprising a circuit arrangement for varying an input impedance of an input circuit of said backscattering transponder to produce a phase modulation of a backscattered signal, said circuit arrangement comprising:
    first and second antenna terminals in the input circuit in order to connect an antenna thereto;
    a varactor that has first and second varactor terminals by which said varactor is connected between said first and second antenna terminals in the input circuit;
    a varactor control arrangement connected to at least one of said varactor terminals in order to apply a variable control voltage to said varactor so as to vary a capacitance of said varactor to thereby vary the input impedance and produce the phase modulation of the backscattered signal; and
    zero or at most one capacitor connected in series with said varactor between said first and second antenna terminals.

2. The backscattering transponder according to claim 1, wherein said circuit arrangement does not include any capacitor connected in series with said varactor between said first and second antenna terminals.

3. The backscattering transponder according to claim 2, wherein said first and second antenna terminals are respectively connected directly to said first and second varactor terminals.

4. The backscattering transponder according to claim 1, including said one capacitor connected in series with said varactor between one of said varactor terminals and one of said antenna terminals, and having another of said antenna terminals connected directly to another of said varactor terminals.

5. The backscattering transponder according to claim 1, further in combination with said antenna, which is a closed loop antenna.

6. The backscattering transponder according to claim 1, further in combination with said antenna, which is an open non-loop antenna.

7. The backscattering transponder according to claim 1, wherein one of said antenna terminals is connected to a reference voltage.

8. The backscattering transponder according to claim 7, wherein said reference voltage is a circuit ground of said circuit arrangement.

9. The backscattering transponder according to claim 7, wherein one of said varactor terminals is connected directly to said one of said antenna terminals that is connected to said reference voltage.

10. The backscattering transponder according to claim 1, further comprising a decoupling capacitor connected between one of said antenna terminals and a reference voltage.

11. The backscattering transponder according to claim 10, wherein said reference voltage is a circuit ground of said circuit arrangement.

12. The backscattering transponder according to claim 10, wherein said one of said antenna terminals is connected directly to one of said varactor terminals.

13. The backscattering transponder according to claim 1, further comprising a transponder circuit unit connected directly or indirectly to one of said antenna terminals.

14. The backscattering transponder according to claim 13, wherein said transponder circuit unit comprises at least one of a rectifier and a symbol recovery circuit.

15. The backscattering transponder according to claim 13, further comprising a decoupling capacitor connected between said one of said antenna terminals and said transponder circuit unit.

16. The backscattering transponder according to claim 15, wherein said one of said antenna terminals is connected directly to one of said varactor terminals.

17. The backscattering transponder according to claim 13, wherein said transponder circuit unit is connected directly to said one of said antenna terminals.

18. The backscattering transponder according to claim 17, wherein said one capacitor is connected in series with said varactor between one of said varactor terminals and said one of said antenna terminals that is connected directly to said transponder circuit unit.

19. The backscattering transponder according to claim 13, wherein said transponder circuit unit incorporates a decoupling capacitor by which said transponder circuit unit is connected to said one of said antenna terminals.

20. A phase modulating backscattering transponder comprising a circuit arrangement for varying an input impedance of an input circuit of said backscattering transponder to produce a phase modulation of a backscattered signal, said circuit arrangement comprising:
    first and second antenna terminals in the input circuit in order to connect an antenna thereto;
    a varactor that has first and second varactor terminals by which said varactor is connected between said first and second antenna terminals in the input circuit; and
    a varactor control arrangement connected to at least one of said varactor terminals in order to apply a variable control voltage to said varactor so as to vary a capacitance of said varactor to thereby vary the input impedance and produce the phase modulation of the backscattered signal;
    wherein said first antenna terminal is connected directly to said first varactor terminal with no capacitor therebetween.

21. The backscattering transponder according to claim 20, wherein said second antenna terminal is connected directly to said second varactor terminal with no capacitor therebetween.

22. The backscattering transponder according to claim 20, further comprising a capacitor connected in series with said varactor between said second antenna terminal and said second varactor terminal.

23. A circuit arrangement adapted to vary an input impedance of an input circuit of a backscattering transponder to produce a phase modulation of a backscattered signal, said circuit arrangement comprising:
    first and second antenna terminals in the input circuit in order to connect an antenna thereto;
    a varactor that has first and second varactor terminals by which said varactor is connected between said first and second antenna terminals in the input circuit;
    a varactor control arrangement connected to at least one of said varactor terminals in order to apply a variable control voltage to said varactor so as to vary a capacitance of said varactor; and exactly one capacitor connected in series with said varactor between one of said varactor terminals and one of said antenna terminals which is further connected to a reference voltage.

24. A circuit arrangement adapted to vary an input impedance of an input circuit of a backscattering transponder to produce a phase modulation of a backscattered signal, said circuit arrangement comprising:

first and second antenna terminals in the input circuit in order to connect an antenna thereto;

a varactor that has first and second varactor terminals by which said varactor is connected between said first and second antenna terminals in the input circuit;

a varactor control arrangement connected to at least one of said varactor terminals in order to apply a variable control voltage to said varactor so as to vary a capacitance of said varactor; and a decoupling capacitor connected between a reference voltage and one of said antenna terminals that is connected directly to one of said varactor terminals;

wherein said circuit arrangement does not include any capacitor connected in series with said varactor between said first and second antenna terminals.

* * * * *